No. 834,021. PATENTED OCT. 23, 1906.
A. PENTECOST.
CLUTCH DEVICE.
APPLICATION FILED JULY 24, 1905.

2 SHEETS—SHEET 1.

Witnesses
J. G. Hinkel
J. J. McCarthy

Inventor
Arthur Pentecost
by Foster, Freeman & Watson
Attorneys

No. 834,021. PATENTED OCT. 23, 1906.
A. PENTECOST.
CLUTCH DEVICE.
APPLICATION FILED JULY 24, 1905.

2 SHEETS—SHEET 2.

Witnesses
J. G. Stinkel
J. J. McCarthy

Inventor
Arthur Pentecost
by Foster, Freeman & Watson
Attorneys

UNITED STATES PATENT OFFICE.

ARTHUR PENTECOST, OF EAST ORANGE, NEW JERSEY, ASSIGNOR TO PIKE ADDING MACHINE COMPANY, OF ORANGE, NEW JERSEY, A CORPORATION OF NEW JERSEY.

CLUTCH DEVICE.

No. 834,021.

Specification of Letters Patent.

Patented Oct. 23, 1906.

Application filed July 24, 1905. Serial No. 271,079.

*To all whom it may concern:*

Be it known that I, ARTHUR PENTECOST, a subject of the King of Great Britain, residing at East Orange, in the county of Essex and State of New Jersey, have invented certain new and useful Improvements in Clutch Devices, of which the following is a specification.

My invention relates to clutch devices for use in connection with a continuously-moving driving member and with a driven member which is required to be rotated from the driving member and arrested at or before completing a rotation; and my invention consists of means for driving the driven member by frictional contact during part of its rotation and positively during the remaining part, as fully set forth hereinafter and illustrated in the accompanying drawings, in which—

Figure 1:
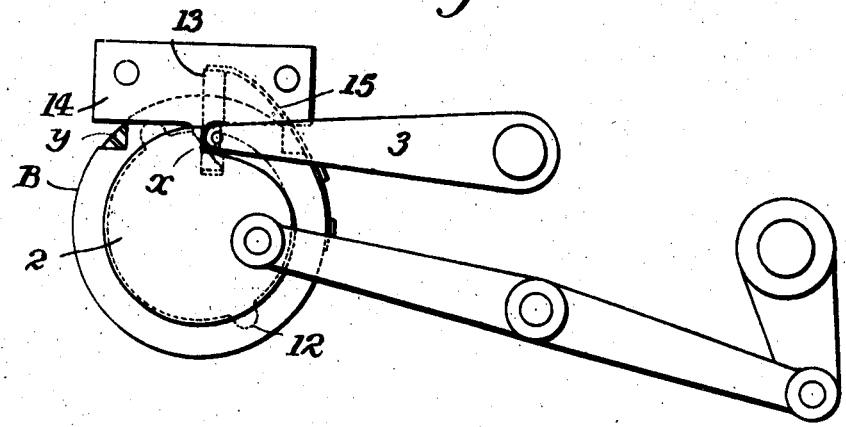
Figure 2:
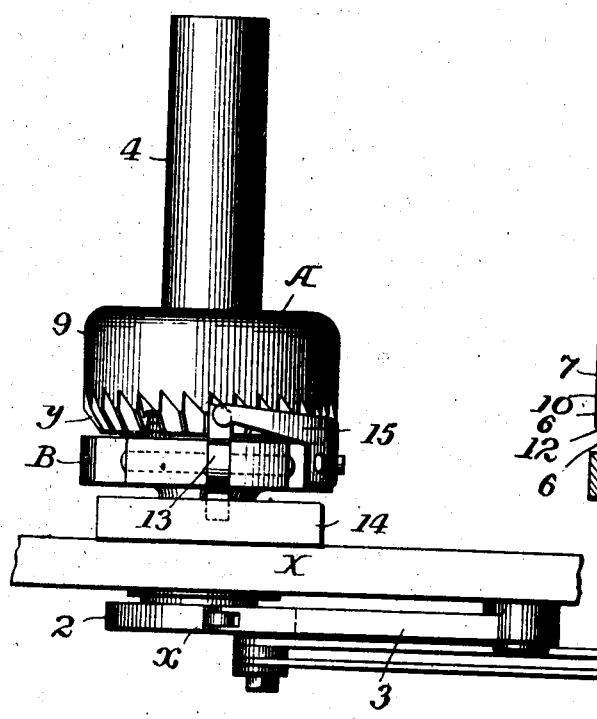
Figure 7:
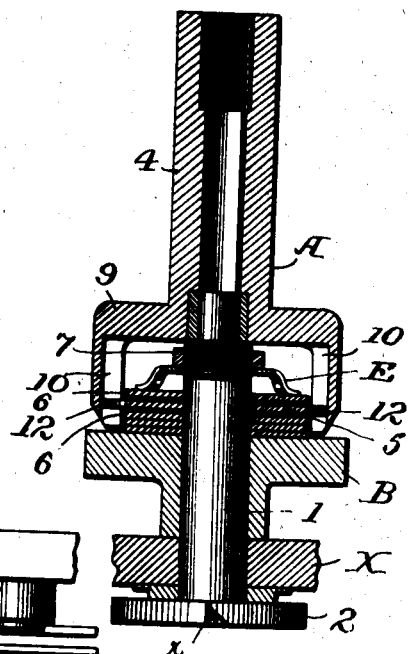
Figure 3:
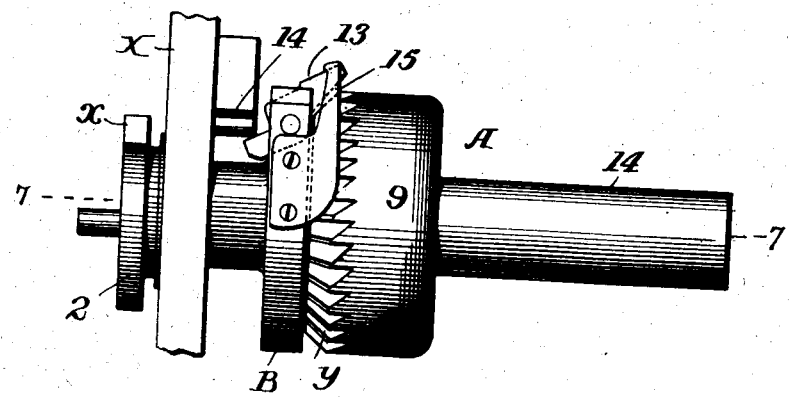
Figure 4:
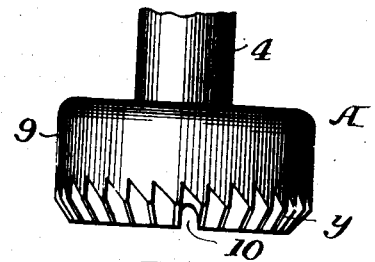
Figure 5:
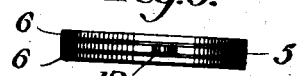
Figure 6:
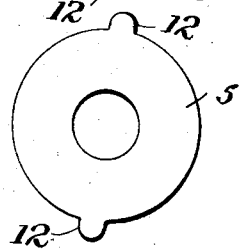

Figure 1 is an end elevation of my clutch device. Fig. 2 is a plan of Fig. 1. Fig. 3 is a side view; Fig. 4, a plan of the driving member. Fig. 5 is an edge view of a part of the device. Fig. 6 is a side view of the part shown in Fig. 5; and Fig. 7 is a section on the line 7 7, Fig. 3.

The clutch device has a driving member A, to which constant rotation is imparted from any suitable source, and a driven member B, together with means whereby the latter may be put into and out of operative connection with the member A. With these parts may be combined means whereby the driven member may be arrested and released, being preferably arrested at the termination of each complete rotation. As shown, the driven member has a shaft 1, on which is mounted a disk 2, having an abrupt shoulder $x$, and a hinged pawl 3 when its end is in contact with said shoulder prevents the rotation of the shaft 1 and driven member.

Between the driving and driven members intervenes a friction-bearing, whereby normally the driven members would be carried with the driver and of a character to maintain a constant stress tending to rotate the driven member by the driving member. Various friction driving means might be used; but, as shown, the shaft 1 of the driven member carries two friction-disks 6 6, between which is arranged a disk 5, connected with the shaft 4, as hereinafter described, said disks being clamped together by means of spring-fingers $e$ on a disk E, the pressure of which may be applied and varied by a nut 7, turning on the threaded end of the shaft 1. It will be understood that the disk 5 is loosely mounted on the shaft 1, while the disks 6 6 are prevented from turning independently of said shaft.

The shaft 4 of the driving member has a muff 9 with recesses 10, adapted to receive lugs 12 on the disk 5, so that the latter will be turned with the driving member, and the driven member will be turned frictionally until the contact of the pawl 3 with the shoulder $x$ arrests the rotation of the driven member.

When friction alone is depended upon to operatively connect the two members, unusual resistance in the apparatus driven may overcome the friction between the two members and lead to detrimental lost motion. To avoid this, I provide means whereby the two members are positively connected when the driven member begins to move under the influence of the driver. Thus the driving member has shoulders $y$ at the edge of the muff 9, and the driven member carries a pivoted dog 13, which when the driven member is at rest is out of operative position, being held with the operating end elevated by the contact of the tail of the dog with a cam projection 14 on the frame or part X, in which the shaft 1 has its bearing. When, however, the detent-pawl 3 is elevated, permitting the shaft 1 to rotate, driven by the constantly-maintained friction from the shaft 4, the tail of the dog will be carried from the cam 14, and the other end of the dog will be forced inward by a spring 15 into position to engage the nearest shoulder $y$ of the driving device, which will then drive the driven member positively during the remainder and working part of the revolution.

As the dog approaches the cam projection 14 as the rotation of the driven member is completed, it will strike the lug thereof and will be disengaged from the driving member, which by its frictional connection with the driven member will complete the rotation of the driven member until the shoulder $x$ strikes the detent 3. It will be seen that owing to the frictional connection between the two parts when one of them is arrested the arrest will be less violent and with less shock than if the positive connection was maintained until the rotation was completed. This connection also arrests the rebound of the driven member which occurs when such member is brought against the stop 3.

It will be evident that different means for maintaining a constant frictional connection between the two members may be used; also, that the stop device and the lock for locking the two parts positively together, as well as the means of shifting the lock, may be varied without departing from the main features of my invention.

Without limiting myself to the construction shown, I claim—

1. A clutch device having a driving and a driven member and friction connection between them arranged to maintain the driven member under constant rotative stress, and means for positively connecting and disconnecting said members during a part of each rotation, substantially as set forth.

2. The combination in a clutch device, of a driving member, a driven member, means connecting the two members frictionally together arranged to maintain the driven member under constant rotative stress, a device for locking the two members positively, and means for shifting said device to unlocking and then to locking position at each complete rotation, substantially as set forth.

3. The combination in a clutch device, of a driving member, a driven member, means connecting the two members frictionally together, a dog carried by one member and shoulders on the other adapted to be engaged by the dog, and means for shifting the dog out of and into locking position at each rotation, substantially as set forth.

4. The combination in a clutch device, of a driving member, a driven member, means connecting the two members frictionally together, a dog carried by one member and shoulders on the other adapted to be engaged by the dog, and a cam for shifting the dog out of and into locking position at each rotation, substantially as set forth.

5. A clutch device having a driving and a driven member and friction connection between them arranged to maintain the driven member under constant rotative stress, means for positively connecting and disconnecting said members during a part of each rotation, and a movable detent for arresting the rotation of the driven member, substantially as set forth.

6. The combination with the driven and driving members of a clutch device and with means for frictionally connecting them arranged to maintain the driven member under constant rotative stress, of a movable detent for arresting the driven member at the end of each rotation, and means for locking the two members positively together after shifting the detent and on the beginning of rotation of the driven member, substantially as set forth.

7. The combination with the driven and driving members of a clutch device, and with means for frictionally connecting them arranged to maintain the driven member under constant rotative stress, of a movable detent for arresting the driven member at the end of each rotation, and means for locking the two members positively together after shifting the detent and on the beginning of rotation of the driven member, and for unlocking the two members prior to completing said rotation, substantially as set forth.

In testimony whereof I have signed my name to this specification in the presence of two subscribing witnesses.

ARTHUR PENTECOST.

Witnesses:
W. J. WARD,
E. C. BOTAILLE.